(12) United States Patent
Daniell et al.

(10) Patent No.: US 8,804,186 B2
(45) Date of Patent: Aug. 12, 2014

(54) AUTOMATED LENTICULAR PHOTOGRAPHIC SYSTEM

(75) Inventors: Stephen S. Daniell, Northampton, MA (US); Steven M. Spiro, Chappaqua, NY (US); David Whelan, Cincinnati, OH (US); James Anderson, Yorktown, NY (US); Daniel L. Lau, Lexington, KY (US)

(73) Assignee: Tracer Imaging LLC, White Plains, NY (US)

( * ) Notice: Subject to any disclaimer, the term of this patent is extended or adjusted under 35 U.S.C. 154(b) by 326 days.

(21) Appl. No.: 13/181,954

(22) Filed: Jul. 13, 2011

(65) Prior Publication Data

US 2012/0067238 A1 Mar. 22, 2012

Related U.S. Application Data

(60) Provisional application No. 61/363,845, filed on Jul. 13, 2010.

(51) Int. Cl.
*G06K 15/00* (2006.01)

(52) U.S. Cl.
USPC ............. 358/1.18; 358/1.12; 359/19; 359/30; 359/455; 359/463; 353/32

(58) Field of Classification Search
USPC .............. 358/1.15, 1.12, 1.18; 355/2; 353/32; 359/619, 19, 30, 463, 455
See application file for complete search history.

(56) References Cited

U.S. PATENT DOCUMENTS

| | | | |
|---|---|---|---|
| 5,408,294 A | 4/1995 | Lam | |
| 5,424,553 A | 6/1995 | Morton | |
| 5,473,406 A * | 12/1995 | Hassall et al. | 355/22 |
| 5,647,151 A * | 7/1997 | Fantone et al. | 40/454 |
| 6,198,544 B1 * | 3/2001 | Wess et al. | 358/296 |
| 6,280,374 B1 * | 8/2001 | Manico et al. | 493/320 |
| 7,002,748 B1 * | 2/2006 | Conley et al. | 359/619 |
| 7,887,722 B1 * | 2/2011 | Wu | 264/1.34 |
| 2002/0198724 A1 | 12/2002 | Peterson | |
| 2006/0061804 A1 * | 3/2006 | Manico et al. | 358/1.15 |
| 2006/0158511 A1 * | 7/2006 | Harrold et al. | 348/51 |

(Continued)

FOREIGN PATENT DOCUMENTS

| | | |
|---|---|---|
| WO | WO 96-26872 | 9/1996 |
| WO | WO 2006-054284 | 5/2006 |

*Primary Examiner* — Jamares Q Washington
(74) *Attorney, Agent, or Firm* — Leason Ellis LLP

(57) ABSTRACT

An automated lenticular photographic system includes an interface that permits a user to upload image files and image processing and printing equipment that is in communication with the interface for receiving the uploaded image files and processing the uploaded image files to create an interlaced print image file that is used to produce an interlaced print sheet containing interlaced print images. A pair of registration marks is formed on the interlaced print sheet outside of borders of the interlaced print images. The system also includes a processing station where the interlaced print sheet is aligned with a lenticular lens sheet with a registration system that detects whether the lenticular lens sheet is off-centered and skewed relative to the interlaced print sheet. The system also includes means for controllably adjusting the position of the lenticular lens sheet relative to the interlaced print sheet until proper registration between the lenticular lens sheet and the interlaced print sheet is achieved. The lenticular lens sheet is at least selectively joined to the interlaced print sheet to provide a lenticular product that can be delivered back to the user.

12 Claims, 11 Drawing Sheets

(56) References Cited

U.S. PATENT DOCUMENTS

| | | | |
|---|---|---|---|
| 2007/0033544 A1 * | 2/2007 | Fleisher et al. | 715/800 |
| 2007/0273140 A1 * | 11/2007 | Bar-Yona | 281/15.1 |
| 2007/0285804 A1 | 12/2007 | Raymond et al. | |
| 2010/0098340 A1 | 4/2010 | Zomet et al. | |

* cited by examiner

AUTOMATED LENTICULAR PHOTOGRAPHIC SYSTEM

CROSS-REFERENCE TO RELATED APPLICATIONS

The present application claims the benefit of U.S. patent application Ser. No. 61/363,845, filed Jul. 13, 2010 which is hereby incorporated by reference in its entirety.

TECHNICAL FIELD

The present invention relates to the printing of lenticular images and more particularly, to an automated lenticular photographic system that includes an interface that permits a user to upload traditional images that are then delivered to at least one processing station where the uploaded images are processed into a lenticular product that is then delivered back to the user.

BACKGROUND

An interactive kiosk is a computer terminal that provides information access via electronic methods. Most kiosks provide unattended access to web applications. Interactive kiosks are typically placed in high foot traffic settings such as hotel lobbies or airports, as well as being located in retail stores or retail malls. Self-service kiosks are hardware devices that work in combination with self service software, allowing users to perform any number of possible transactions. The method of input can be either a keyboard, touch-screen, or both. Some kiosks include card readers, ticket and receipt printers, bill and coin depositors, robotic product arrays and other more complex mechanical devices. Most kiosks are connected to the internet and are providing access to a customized, unattended version of some sort of application often in conjunction with local devices such as credit card readers, bar code scanners, receipt printers, and more and more identification devices including biometrics. Intended for both consumers and business industries, benefits of self-service kiosks include ease of access, reduced transaction time, access to information and the ability to perform multiple transactions.

Integration of technology allows kiosks to perform a wide range of functions allowing an evolution into self-service kiosks. Some of the more common applications for a kiosk are: financial service which includes: bill payment, check cashing and credit applications; retail product information such as in-store product lookup and information; customer check-in such as airlines and hotels, etc. While many kiosks are designed to provide financial services, there are also a number of kiosks that provide retail services including product purchase. For example, one type of retail based kiosk is an interactive kiosk which allows users to print pictures from their digital images. Two major classes of photo kiosks exist; namely, (1) digital order stations and (2) instant print stations. A digital order station is a type of photo kiosk that exists within retail locations and allows users to place order for prints and photographic products. Products typically get produced in store by a digital minilab, or at another location to be shipped directly to the consumer, or back to the store to be picked up at a later time. Digital order stations may or may not support instant printing, and typically do not handle payments. In contrast, an instant print station is a type of photo kiosk that uses internal printers to instantly create photographic prints for a self serve paying customer. Often such systems will only print 4×6 inch prints although popular dye sublimation photo printers allow for 4×6, 5×7, 8×10, and 8×12. Some of the photo kiosks do allow certain manipulations and add-ons to be done. For example, a border can be selected and viewed around the uploaded image.

Lenticular images are different than the digital images that are processed with conventional photo kiosks. Lenticular images typically employ cylindrical lens arrays which have been extruded and cut into standard size sheets. In current practice using conventional techniques, these sheets are usually reverse-printed on their flat, unlenticulated side with a specially prepared interlaced image. Because the lens arrays allow the image to vary with the angle of view, lenticular images can be given diverse properties of apparent depth and animation. These qualities have long been found to be highly effective in advertising, marketing, and promotion. In addition, these qualities are perceived as having a degree of interest and value apart from the initial visual encounter.

It is desirable to offer a consumer lenticular product that can be easily and conveniently ordered using a user interface in the form of a kiosk or website by simply uploading a traditional image (e.g., digital image) and then entering order and processing information as well as a means of payment.

SUMMARY

The present invention relates to the printing of lenticular images and more particularly, to an automated lenticular photographic system that includes an interface that permits a user to upload traditional images (digital image files) that are then delivered to at least one processing station where the uploaded images are processed into a lenticular product that is then delivered back to the user. Software can be installed on the kiosk and written so that a user of a traditional photo kiosk is given the option of ordering and producing a lenticular product. For example, an icon or the like (e.g., a corporate name or trademark or product name, etc.) can be displayed on a main page and once the user selects the icon, as by touching the icon image on the screen, the user is then shown a main home page specific to lenticular products. The user can be presented with a number of different lenticular products from which to choose and in the illustrated embodiment, two exemplary lenticular products that are presented are: (1) a "3-Flip" lenticular product and (2) a "Zoom" lenticular product.

As with traditional photo kiosks, the user can browse the uploaded photos with tools, such as forward and back arrows, etc. To select individual photos, the user simply makes a selection using a keyboard or more likely, simply touches the desired photo which results in the photo being highlighted to indicate it is a chosen/selected photo. After making selections, the user is provided with a preview of the lenticular product that has been previously selected.

Once the order is placed, a data file is sent from the user interface to an image processing/printing device. The data file not only includes the selected photos (selected uploaded images) but it also includes other user (consumer) identifying information as well as control and instruction data, etc. At the downstream processing station, the data file is received and further processed in order to produce the end lenticular product purchased by the user (consumer). For example, the received data file can be processed into an interlaced print file that can be stored in memory and then processed to form an interlaced print.

An automated system can be provided for the assembly, alignment and adhesion of a lenticular image as part of a process to form the ordered lenticular product. The automated system has a number of components that ensure the proper alignment between the preprinted image (interlaced print)

and lenticular lenses (lens sheet) that overlie the preprinted image. The alignment registration of lenticular lenses with a preprinted image is increasingly challenging as the lens pitch becomes smaller. Lenses must be parallel to the printed image raster, and each interlaced image band must also be exactly aligned with an associated lens. The present invention provides a simple and compact alignment and registration indicator which exploits a conscientious difference in spatial frequency between a repeated image icon and the lenticular array. An indicator (registration mark) can be made so that is serves as an intuitive guide to any positional errors. When two indicators (registration marks) are used at opposite ends a printed sheet, very slight deviations from optimal alignment can be detected. The use of two oppositely located registration marks therefore enables the alignment of relatively large sheets of relatively fine pitch. The registration mark can be read by machine, as well as by a human operator. By substitution of a known finite magnification value, accommodation can be made for production circumstances in which the mark is not, or cannot be, located at the focal length of the lenses, as for example, when a film adhesive is provided with a temporary release liner.

An optic device is aimed through the lenticular sheet to focus upon two specially devised targets (registration marks) located as substantially opposite ends of a lenticular lens sheet. The lenticulated sheet is placed in a temporary, roughly aligned position on top of the sheet carrying at least one preprinted, interlaced image between the targets. The lens sheet is then gripped, at least two locations, by a mechanical clamping device or the like. Each clamping device is connected to an actuator. The actuators are advanced or retracted based on information derived from the image of the targets received by the optic device. By conscientiously imparting relative motion to the actuators, the gripped lens sheet is shifted until it is in precise alignment with the preprinted interlaced image content.

The automated system also includes other features to ensure the proper alignment between the two sheets and to provide a partial bond therebetween as a precursor to a final lamination process where a laminated lenticular product is formed.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
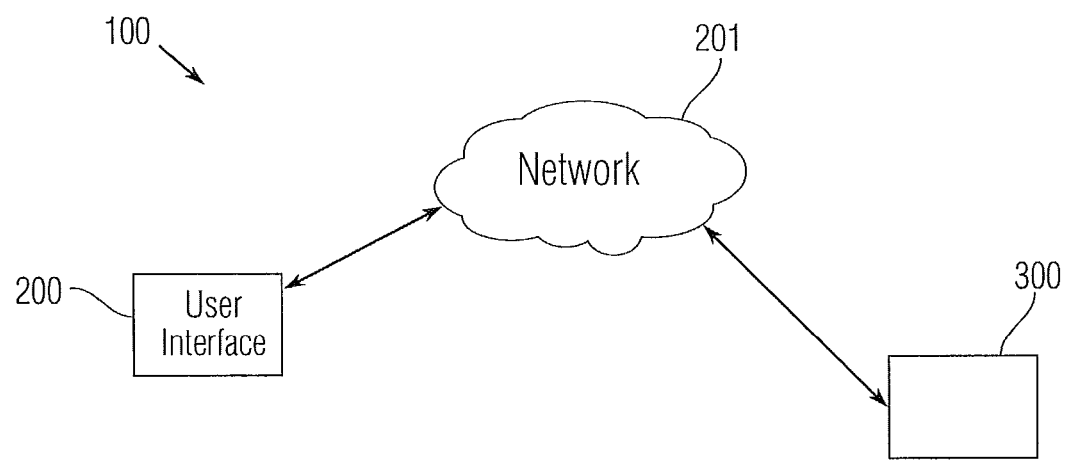
FIG. 1 illustrates the basic components of an automated lenticular photographic system according to one embodiment of the present invention.

FIG. 1 is a general schematic showing the basic components of an automated lenticular photographic system 100 according to one embodiment of the present invention. The system 100 generally includes a user interface 200 and a processing and production station 300 where a custom lenticular product is manufactured based on instructions, information and files provided by the user. The user interface 200 communicates with the processing and production station 300 using any number of different communication technologies, including communicating over a wireless network 201. For example and as shown in FIG. 1, the user interface 200 communicates with the station 300 over the internet. After manufacturing, the custom lenticular product is delivered to the user using traditional transportation means, such as by post or courier.

It will also be appreciated and understood that FIG. 1 broadly illustrates exemplary stations and components that are part of the system 100 of the present invention; however, additional stations, such as one or more servers, image processing stations, printing stations, cutting stations, packaging stations, etc. can be provided as described below. It will also be appreciated that one or more of the various stations can be located in different physical locations relative to the other components/stations or multiple stations can be at one physical location. For example, the information inputted by the user at the user interface 200 can be delivered to a first processing station where the inputted information, including uploaded images, is stored in an unedited form. As described below, this unedited information is then further processed (e.g., at a different processing station) to produce an interlaced print image file based on the inputted information and it is this interlaced print image file that is delivered to a print station where an interlaced print is produced.

A user interface location is simply a location where a user can enter instructions, upload files, etc. that are later processed for the manufacture of the custom lenticular product. This location can either be at a public location, such as at a kiosk at a retail store, or it can be at a private location, such as personal computer at a personal residence. In accordance with the present invention, the user interface 100 can be any number of different types of devices including but not limited to standalone units, such as a kiosk, or a personal computer that is connected to a network, such as the internet 150.

In accordance with one embodiment of the present invention, the user interface 100 is in the form of an in-store kiosk or a kiosk that is located in some other location. For example, the kiosk 100 can be located in a retail store, such as a large department store or pharmacy, where traditional photo kiosks are typically located. In fact, it will be appreciated that existing, traditional kiosks can be retrofitted to offer the service described herein by simply adding additional software to run the kiosk. In other words, software can be installed, relatively easy, on a nationwide network of kiosks in order to convert the kiosks to offer the service described herein in accordance with the present invention.

Figure 2:
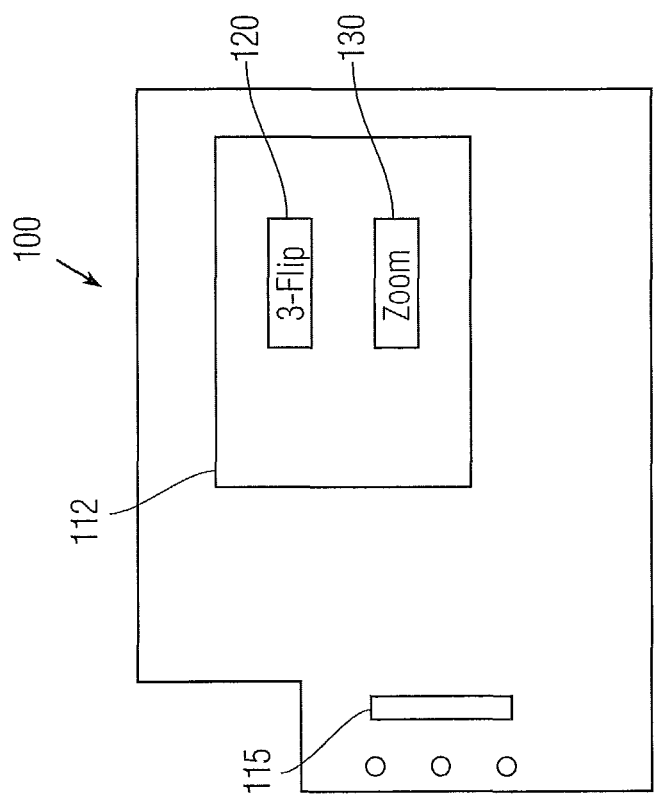
FIG. 2 is a front elevation of an exemplary kiosk user interface and display.

As shown in FIG. 2, the kiosk includes a display 112 which is typically in the form of an interactive screen. In one embodiment, the display 112 is part of a touch screen system where the user makes selections and inputs data by touching certain areas of the screen when prompted. Slot 115 receives media (e.g., a memory card) containing the images.

The software installed on the kiosk can be written so that a user of a traditional photo kiosk is given the option of ordering and producing a lenticular product. For example, an icon or the like (e.g., a corporate name or trademark or product name, etc.) can be displayed on a main page and once the user selects the icon, as by touching the icon image on the screen, the user is then shown a main home page specific to lenticular products. For example and as shown in FIG. 2, the user can be presented with a number of different lenticular products from which to choose and in the illustrated embodiment, two exemplary lenticular products that are presented are: (1) "3-Flip" as illustrated by icon/indicia 120 and (2) "Zoom" as illustrated by icon/indicia 130. These two lenticular products are described in more detail below. The user can choose the desired lenticular product by either using a keyboard and/or by touching the screen. After the user chooses the lenticular product, the user is then prompted and/or can make selections so as to upload and/or choose images from the uploaded images (e.g., an online photo album). For example, the user can insert into the slot 115 a memory card (e.g., an SD card) or a CD (compact disc) that contains photo images in the form of files (such as JPEG, TIFF, RAW, or DNG) that are stored on the media.

Figure 3:
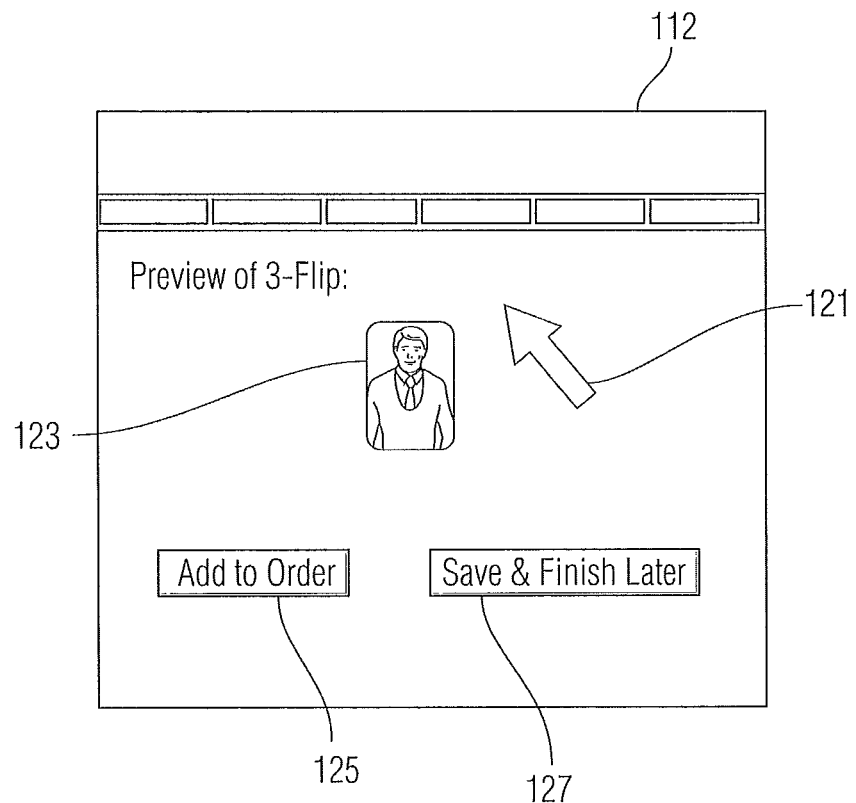
FIG. 3 is a screen shot of the kiosk showing steps to order a 3-Flip lenticular product.

As with traditional photo kiosks, the user can browse the uploaded photos with tools, such as forward and back arrows, etc. To select individual photos, the user simply makes a selection using a keyboard or more likely, simply touches the desired photo which results in the photo being highlighted to indicate it is a chosen/selected photo. As shown in FIG. 3, after making selections, the user is provided with a preview of the lenticular product that has been previously selected. For example, if the user selects 3-Flip, then a preview of a 3-Flip lenticular product is provided. As shown in FIG. 3, the user can move a tool 121, such as an arrow, to highlight and press a preview icon 123 and a preview image is generated (as represented by at least one of the uploaded photos). If the user wishes to purchase this customized lenticular product, the user can simply select the "Add to Order" button 125 which results in the lenticular product being stored in a cart. If the user is not yet ready for making a purchase, the user can select the "Save and Finish Later" button 127 and the customized lenticular product will be saved for a potential purchase at a later time. Much like any internet retail store, the user proceeds with purchasing the product by entering the cart and then entering user identification information, such as the user's full name, address, etc., as well as a means for payment.

As mentioned above, two types of lenticular products that can be offered for purchase are a 3-Flip image option and a Zoom image option. In the 3-Flip lenticular product, three images flip from one to another depending upon the viewing angle. A 2-Flip is where two images flip from one to the other. When the Flip image option is selected, the user selects Flip images from the uploaded images. An optional border and/or text can be provided. For example, the user can select a border icon and then follow different steps to view different border options. Finally, a preview can be generated and the user can proceed with purchase as discussed above.

Figure 4:
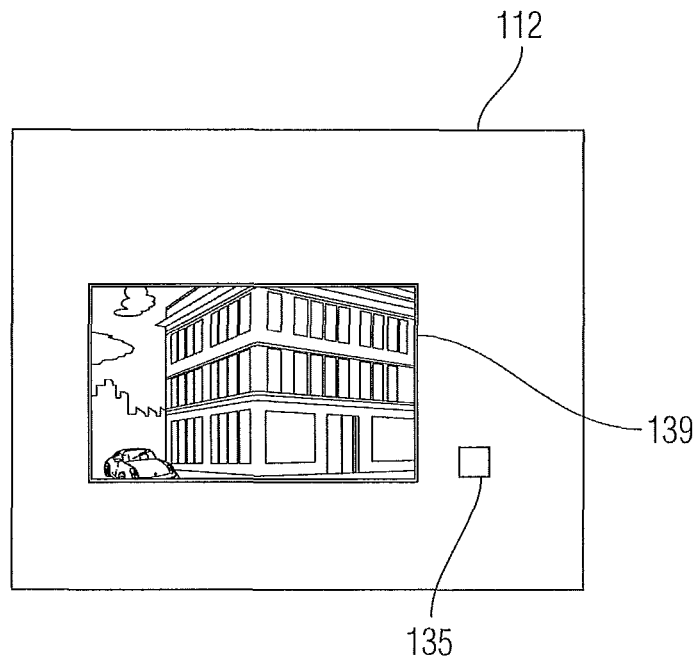
FIG. 4 is screen shot of the kiosk showing a Zoon lenticular product with a movable tool.

In the Zoom image option, one image zooms into an enlarged area as the viewing angle of the lenticular product is changed. For example, the basic image can be in the form of a team picture and the zoom aspect can zoom in on one of the players. When the Zoom image option is selected, a zoom image is selected from the uploaded images as shown in FIG. 4. A square or rectangular positioning tool 135 is positioned over the portion of the image 139 (photo) that is intended to be zoomed. The size of the tool 135 can be changed. An optional border and/or text can be provided. For example, the user can select a border icon and then follow different steps to view different border options. Finally, a preview can be generated and the user can proceed with purchase as discussed above.

In accordance with the present invention, the software that is part of the user interface (kiosk, PC, etc.) is configured so that it provides automated lenticular recommendations. In particular, the software improves the customer experience and increases sales of individualized lenticular products by being programmed so as to review the user's order and make and/or suggest changes that will optimize the lenticular product or give any error or warning messages to the user. Lenticular images have special requirements such that not all images translate effectively into every type of lenticular product. For example, a video sequence captured and uploaded by a customer can only include a finite number of frames which are free of motion blur. When a customer's source medium or media are anticipated to be suboptimal, prompts based on the qualified image set are made and electively presented to the retail client (user) in the form of a video preview. Other examples of automated lenticular recommendations include the substitution of a two or three phase flip image for a continuous animation, or a lenticular zoom image from a single technically qualified image.

In addition, the drag square/rectangular positioning tool 135 used in the Zoom image option, as discussed above, can vary in sized based on a resolution of the uploaded image (for example, a higher resolution image may allow zooms to a smaller relative area). The user selects the zoom positioning tool from a sidebar, toolbar, etc., and drags the positioning tool to the final zoom location. A user can be provided with a number of different sized positioning tools, e.g., a maximum of three; however, if the uploaded image is too small, the positioning tool will be disallowed and will not be presented.

Alternatively, the user interface 100 can be in the form of a website and in particular, a website of a retailer, such as a large department chain or pharmacy, or can be in the form of a website of an internet-based personal publishing service company that provides products and services that make it possible for consumers to upload, share and print photos. The process for uploading, selecting, previewing and placing an order is identical or similar to that described above in the discussion of a photo kiosk application and therefore, these steps will not be described again in detail.

It will also be understood that the user interface 200 can also be in the form of a handheld device that supports and includes the necessary functionality. For example, the user interface 100 can be in the form of a PDA or smartphone.

Once the order is placed, a data file is sent either from the in-store kiosk or from the retailer's website to another location, such as the processing station 300. The data file not only includes the selected photos (selected uploaded images) but it also includes other user (consumer) identifying information as well as control and instruction data, etc. At the processing station 300, the data file is received and further processed in order to produce the end lenticular product purchased by the user (consumer). For example, the received data file can be processed into an interlaced print file that can be stored in memory and then processed to form an interlaced print as discussed herein.

Predesigned lenticular effects can benefit from expert design and optimized graphics. Templates which include intentionally designed lenticular graphics can therefore enhance the perceived value of a lenticular product. Furthermore, these effects can make the finished image more attractive for composition from multiple sources, seasonal customization, personalization, reinforcement of the image theme, or gift-giving. Templates can also be used to sell and track commercially licensed imagery.

In yet another aspect, the present invention can be designed to provide a compact lenticular image file set that provides a number of advantages as discussed herein. Lenticular images represent multiple viewpoints to the viewer. The underlying interlaced images can be composed from any series of related or unrelated images. High-quality lenticular prints can utilize sixteen or more images. This file set can be very large and can require prohibitive bandwidth. Furthermore, retail kiosks rarely include processing capable of lenticular interlacing. In view of the foregoing, the software of the present invention is configured so that images be scaled to optimal size prior to electronic transfer from the user interface (kiosk) 200 to downstream equipment, such as downstream servers, image processing and/or printing stations (e.g., stations 300). The minimized files (scaled down) can then be directly interlaced at a remote location, such as processing station 300. When appropriate, file minimization may include foreknowledge of pitch of the lenses and the dimension of the print, so that the number of pixels in the relevant axis can be resampled to be effectively commensurate with the number of anticipated lenses. The minimized file set can also be tagged with image filtering and processing instructions, adjustment values, customer data, or any other useful order data. Accordingly, the minimized file includes unedited data and images that are sent as a file to another location for storage and/or further processing (e.g., creation of an interlaced print image file).

As previously mentioned, the processing station 300 can include one or more stations that can be at the same physical location or they can be located at different physical locations. The processing station 300 includes image processing and printing equipment that is configured so that the image(s) and data file(s) received from the user interface 200 is further processed to create an interlaced print image file, based on the customer's order. The interlaced print image file can be stored and is then sent to printing equipment that is configured to print lenticular images. In accordance with one aspect of the present invention, multiple images can be laid out on a single sheet. In the practice of the invention it has been found useful to designate a specific dimensional margin separating the images. An interlaced image is made up of a series of image fields, each image field ultimately corresponding to a single lens. In prior practice of the lenticular art, it is understood that a very slight progressive displacement of the image fields from the lens footprint is generally optimal, in order to direct the magnified lenticular image data to a finite viewing distance.

The specific outward shift is generally derived through trigonometry and a prior knowledge of the lens materials refractive properties, or computer modeling with software, or through empirical experimentation. Within the invention, it has been discovered that neighboring images may be advantageously laid out so that the last complete image field of each image can be set apart from its neighbor by a specific fractional value less than the common lens pitch.

For example, an image provided with a 400 micron wide image field may be separated from its neighbor's last complete image field by 320 microns. This value may also be the sum of the any multiple of the image field width and the spacer separation, e.g., these sums in the aforementioned case being 720μ, 1120μ, 1520μ, etc. Unless the image division has a further purpose, it is, as a rule, preferable to minimize the separation between images. This conscientious arrangement permits each individual image to be separately optimized for a electable viewing distance and location, while allowing several images carried on a common substrate to be simultaneously aligned to a monolithic sheet of lens material.

The spacer separation need not be symmetrical, but should instead accord with the anticipated requirements of the neighboring images. The neighboring lenticular mages may be of differing sizes and orientations, and still accord with the scope and intent of the present invention. The resulting interlaced print sheets can be arranged in a stack for further processing as discussed below.

Figure 5:
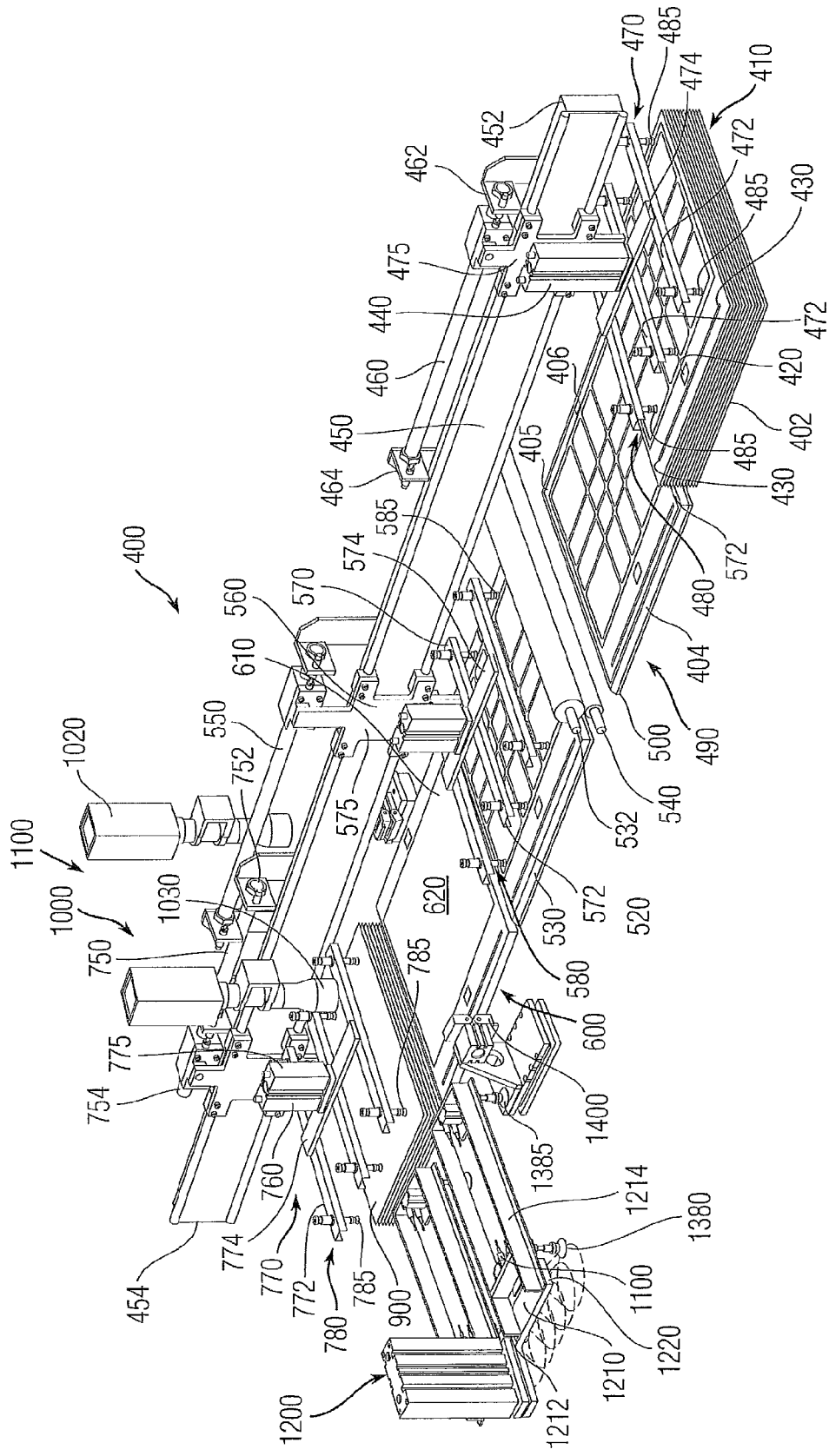
FIG. 5 is a side perspective view of an automated system for the assembly, alignment and adhesion of a lenticular product according to a first embodiment.
Figure 6:
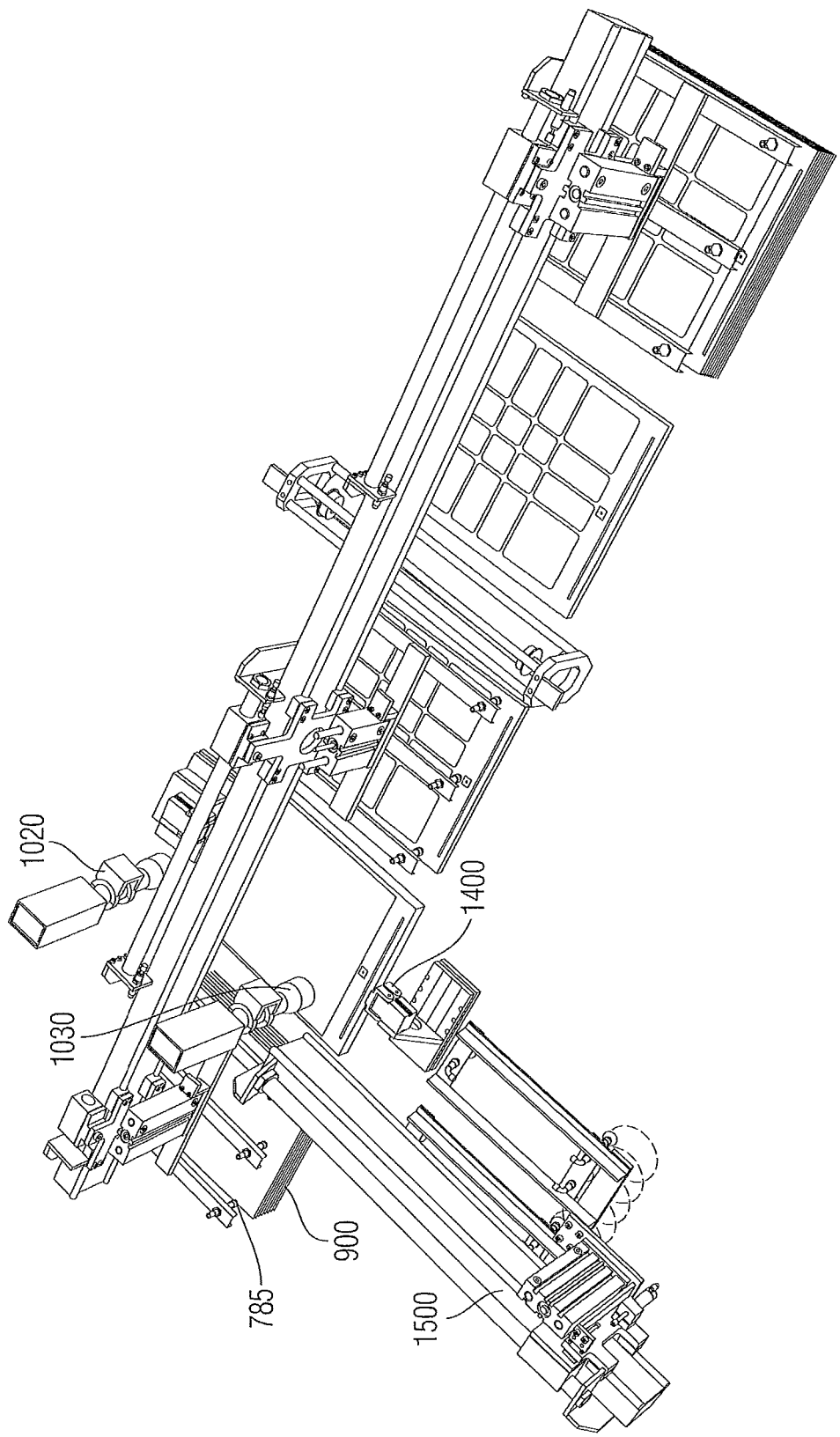
FIG. 6 is a top perspective view of an automated system for the assembly, alignment and adhesion of a lenticular product.
Figure 7:
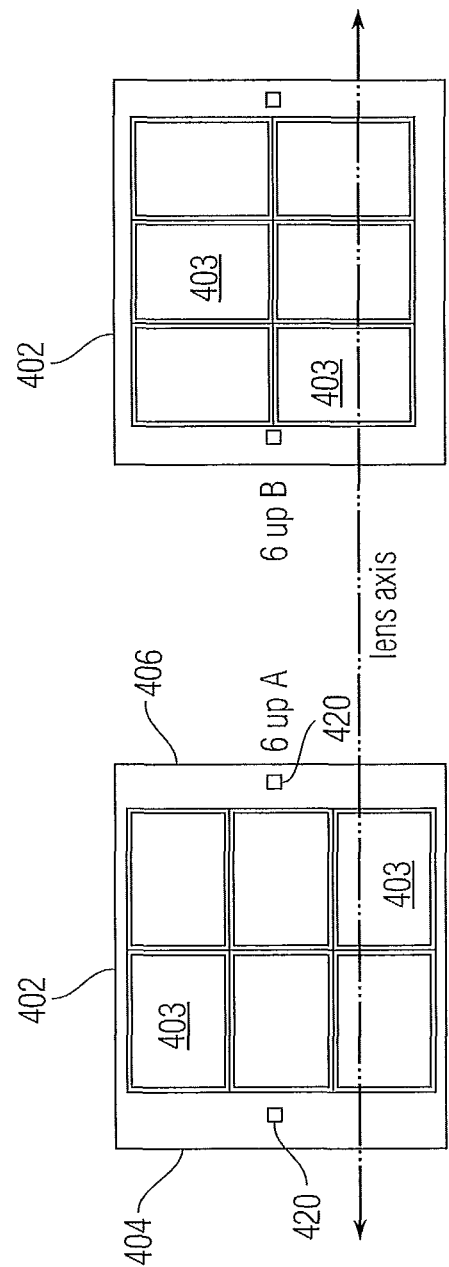
FIG. 7A is a top plan view of print sheet including a plurality of interlaced prints arranged in a first orientation.
FIG. 7B is a top plan view of a print sheet including a plurality of interlaced prints arranged in a second orientation.

Now referring to FIGS. 5-6, the processing station 300 according to one embodiment of the present invention includes an automated system 400 for the assembly, alignment and adhesion of a lenticular image (lenticular product). FIG. 5 is a perspective view of that automated system 400 which itself is formed of a number of individual components and/or stations. For example, the automated system 400 includes a first station 410 for storing a stack of interlaced print sheets 402. As mentioned above and shown in FIGS. 7A and 7B, each interlaced print sheet 402 can include more than one interlaced image 403 (e.g., each sheet can contain 6 interlaced print images as shown in different orientations in FIGS. 7A and 7B). The interlaced print sheet 402 is typically square or rectangular in shape and at least includes a first side 404 and an opposing second side 406. In the illustrated embodiment, the sheet 402 has a generally square shape with the sides 404, 406 opposite one another. As discussed in more detail below, a pair of registration marks 420 is formed on the sheet 402 outside of the borders of the interlaced print images and more particularly, one registration mark 420 is formed along the side 404 and the other registration mark 420 is formed along the other side 406 directly opposite to one another. The sheet 402 also preferably includes an adhesive locator mark 430 (FIG. 5) that is subsequently used as a guide for laying down adhesive along one side 406 of the sheet 402 as described below. As shown in FIG. 5, the adhesive locator mark 430 can be in the form a line that is visually identifiable and is located between the registration mark 420 and the edge of the side 404, 406. All of the sheets 402 are arranged uniformly in the stack in that all of the registration marks 420 of the various sheets 402 overlie one another and are aligned and similarly, the locator marks 430 of the various sheets 402 overlie one another. The sheets 402 are arranged in the stack with the print side facing up.

The first station 410 is not only where the stack of sheets 402 is located but also is a location where a sheet 402 is selectively transported from the first station 410 to another station at a downstream location. The automated system 400 includes an automated and controllable means for transporting one sheet 402 from one location to another location. For example, the transportation means can be in the form of a first controllable movable member, such as a robotic carriage 440, that moves along a main track 450. The main track 450 has a first end 452 and an opposing second end 454 with the first end 452 being located at the first station 410. In addition to the main track 450, there is a first secondary track 460 on which the carriage 440 moves. The first secondary track 460 has a first end 462 and an opposing second end 464 with the first end 462 being located at the first station 410. In the illustrated embodiment, the first secondary track 460 is located at the top of the main track 450 and has a length that is less than the main track 450 such that the first secondary track 460 only extends along a portion of the main track 450.

In the illustrated embodiment, the first carriage 440 is operatively coupled to both the first secondary track 460 and the main track 450 and has a range of motion based on the length of the first secondary track 460 in that the ends 462, 464 of the secondary track 460 define the limits of the travel of the first carriage 440. The main track 450 and the first secondary track 460 can include rails on which the carriage is driven. The first carriage 440 is coupled to the secondary track 460 at a top portion thereof and is coupled to the main track 450 along its center and bottom portions. The first carriage 440 includes a frame 470 that supports a sheet pickup mechanism 480. The frame 470 includes a plurality of parallel support members 472 and a cross bar 474 that is coupled to the parallel support members 472. A coupling member 475 couples the frame 470 to a rail that is part of the main track 450.

The sheet pickup mechanism 480 can be in the form of a vacuum system that includes a plurality of vacuum ports 485 that are arranged and positioned along the frame 470 and more specifically, about the support members 472. In the illustrated embodiment, there are six (6) vacuum ports 485 that are located at each end of each support member 472. Each vacuum port 485 extends downwardly from the frame and includes a sheet engaging portion (e.g., a cup shaped vacuum member) that contacts the sheet 402. The vacuum ports 485 are operatively connected to a vacuum source so that a vacuum can be provided in the vacuum ports 485 when a controller is actuated. The vacuum ports 485 are arranged so that each corner of the sheet 402 has a corresponding vacuum port 485 positioned thereover and additional vacuum ports 485 can be located centrally over the sides 404, 406 of the sheet 402 proximate the registration marks 420.

The sheet pickup mechanism 480 is part of a robotic system and therefore it can be moved in a controlled manner. For example, the frame 470 can be at least moved in an up and down manner to permit the vacuum ports 485 to move between a retracted position and an extended position where the vacuum ports 485 are brought into a proximate relationship with the underlying sheet 402. Any number of different types of actuators can be used to effectuate the movement of the frame 470 between multiple, different positions. When each vacuum port 485 is actuated, negative pressure is formed in each vacuum port 485 causing and due to the close proximity between the sheet 402 and the frame 470, the sheet 402 is drawn toward (lifted up from the underlying sheets 402) and held in place by the vacuum. Once the sheet 402 is held by the vacuum ports 485 of the frame 470, movement of the first carriage 440 along the first secondary track 460 and the main track 450 results in the sheet 402 being capable of being lifted and moved from one location (station) to another location (station).

It will be appreciated that the pickup mechanism 480 can include sensors of the like to detect the distance between the sheet 402 and the vacuum ports 485. In addition, in one embodiment, the support members 472 of the frame 470 are adjustable based on the dimensions of the sheet 402. For example, the support members 472 can be adjusted so that the vacuum ports 485 are positioned over the corners of the sheet 402.

For example, the held sheet 402 can be moved to a second station 490 that is located along both the first secondary track 460 and the main track 450. In particular, the second station 490 is located at the second end 464 of the first secondary track 460. The second station 490 includes a movable vacuum platen 500 that includes a top surface 510 that faces the main track 450 and the first secondary track 460. The vacuum platen 500 can be in the form of a plate or substrate that moves linearly along a track (not shown). The platen 500 is constructed so that it includes a plurality of vacuum openings (not shown) that are formed along the top surface 510. The platen 500 is operatively connected to the vacuum source so that when the vacuum is actuated, a vacuum is generated along the top surface 510 for holding down the sheet 402 on the top surface 510.

To position one sheet 402 on the top surface 510, the first carriage 440 is driven toward the second end 464 of the first secondary track 460 until the frame 470 is located above the top surface 510 of the platen 500. The frame 470 can then be moved downward toward the platen 500 to position the sheet 402 in close proximity to the top surface 510. The vacuum in the vacuum ports 485 is then eliminated resulting in the sheet 402 being released and moving toward the platen 500. The vacuum that is associated with the platen 500 can be actuated prior to the vacuum ports 485 being disconnected from the vacuum so as to assist in pulling the sheet 402 onto the top surface 510 of the platen 500.

Once the first carriage 440 releases the sheet 402, the first carriage 440 moves back to the first station 410 where the first carriage 440 is positioned back over the stack of sheets 402 and frame 470 can be actuated so that the frame 470 is positioned over the next sheet 402 and the vacuum is actuated to cause the sheet 402 to be drawn toward and held in place by the vacuum ports 485.

The platen 500 in the illustrated embodiment is movable in a linear manner in a direction that is both toward and away from the first station 410. For example, the platen 500 can be movable along guide tracks or the like (not shown).

The system 400 includes a third station 520 that is downstream of the second station 490. The third station 520 includes a substrate (e.g., table) 530 that has a planar top surface 532 that has dimensions that can accommodate the sheet 402. Between the second station 490 and the third station 520, a pair of rollers 540 is provided. The rollers 540 can be nip rolls or pinch rolls that are powered rolls that are used as a puller for moving the sheet 402 from the second station 490 to the third station 520. In particular, the platen 500 carrying the sheet 402 is moved in a direction toward the third station 520 and the rollers 540 are positioned such that a leading side 405 of the sheet 402 is placed into contact with the rollers 540. When the leading side 405 contacts the rollers 540, the leading side 405 and the rest of the sheet 402 is fed between the two rollers 540 to cause linear movement of the sheet 402 from the platen 500 to the substrate 530 at the third station 520. The rollers 540 also serve as a mechanism for cleaning the sheet 402 from foreign debris (dust). For example, the relatively small lower roller shown may be a powered cylinder, and the relatively upper cylinder may carry a spool of mild adhesive to draw debris from the surface. In general, the system may also include additional cleaners, air filters, air impingement nozzles, anti-static materials, structures, or mechanisms, as are appropriate to maintain a predetermined level of cleanliness. It should also be noted that frame 470 may be devised to transport prints directly into the nip between rollers 540.

The system also includes a second secondary track 550 that is located along a portion of the main track 450. Like the first secondary track 460, the second secondary track 550 has a first end 552 and an opposing second end 554 with the first end 552 being located at the third station 520. A second carriage 560 can be the same or similar to the first carriage 440 and is operatively coupled to both the second secondary track 550 and the main track 450 and has a range of motion based on the length of the second secondary track 550 in that the ends 552, 554 of the secondary track 550 define the limits of the travel of the second carriage 560. The main track 450 and the second secondary track 550 can include rails on which the carriage 560 is driven. The second carriage 560 is coupled to the second secondary track 550 at a top portion thereof and is coupled to the main track 450 along its center and bottom portions. The second carriage 550 includes a frame 570 that supports the sheet pickup mechanism 580. The frame 570 includes a plurality of parallel support members 572 and a cross bar 574 that is coupled to the parallel support members 572. A coupling member 575 couples the frame 570 to a rail that is part of the main track 450.

The sheet pickup mechanism 580 can be in the form of a vacuum system that includes a plurality of vacuum ports 585 that are arranged and positioned along the frame 570 and more specifically, about the support members 572. In the illustrated embodiment, there are six (6) vacuum ports 585 that are located at each end of each support member 572. Each vacuum port 585 extends downwardly from the frame and includes a sheet engaging portion 586 (e.g., a cup shaped vacuum member) that contacts the sheet 402. The vacuum ports 585 are operatively connected to a vacuum source so that a vacuum can be provided in the vacuum ports 585 when a controller is actuated. The vacuum ports 585 are arranged so that each corner of the sheet 402 has a corresponding vacuum port 585 positioned thereover and additional vacuum ports 585 can be located centrally over the sides 404, 406 of the sheet 402 proximate the registration marks 420.

The sheet pickup mechanism 580 is part of a robotic system and therefore it can be moved in a controlled manner. For example, the frame 570 can be at least moved in an up and down manner to permit the vacuum ports 585 to move between a retracted position and an extended position where the vacuum ports 585 are brought into a proximate relationship with the underlying sheet 402. Any number of different types of actuators can be used to effectuate the movement of the frame 570 between multiple, different positions. When each vacuum port 585 is actuated, negative pressure is formed in each vacuum port 585 causing and due to the close proximity between the sheet 402 and the frame 570, the sheet 402 is drawn toward (lifted up from the underlying sheets 402) and held in place by the vacuum. Once the sheet 402 is held by the vacuum ports 585 of the frame 570, movement of the second carriage 550 along the second secondary track 460 and the main track 450 results in the sheet 402 being capable of being moved from one location (station) to another location (station).

More specifically, the sheet pickup mechanism 580 is intended to move the sheet 402 from the substrate at the third station 520 to another downstream processing location, such as a fourth station 600. The fourth station 600 has a substrate 610 with a top planar surface 620 which receives the sheet 402 from the third station 520. The first secondary track 460 does not extend to the third station 520 and similarly, the second secondary track 460 does not extend to second station 490.

The system also includes a third secondary track 750 that is located along a portion of the main track 450. Like the first and second secondary tracks, the third secondary track 750 has a first end 752 and an opposing second end 754 with the first end 752 being located at the fourth station 600. A third carriage 760 can be the same or similar to the first and second carriages and is operatively coupled to both the third secondary track 750 and the main track 450 and has a range of motion based on the length of the third secondary track 750 in that the ends 752, 754 of the secondary track 750 define the limits of the travel of the third carriage 760. The main track 450 and the second secondary track 750 can include rails on which the carriage 760 is driven. The second carriage 760 is coupled to the third secondary track 750 at a top portion thereof and is coupled to the main track 450 along its center and bottom portions. The third carriage 760 includes a frame 770 that supports the sheet pickup mechanism 780. The frame 770 includes a plurality of parallel support members 772 and a cross bar 774 that is coupled to the parallel support members 772. A coupling member 775 coupled the frame 770 to a rail that is part of the main track 450.

The sheet pickup mechanism 780 can be in the form of a vacuum system that includes a plurality of vacuum ports 785 that are arranged and positioned along the frame 770 and more specifically, about the support members 772. In the illustrated embodiment, there are six (6) vacuum ports 785 that are located at each end of each support member 772. Each vacuum port 785 extends downwardly from the frame and includes a sheet engaging portion (e.g., a cup shaped vacuum member) that contacts the sheet 402. The vacuum ports 785 are operatively connected to a vacuum source so that a vacuum can be provided in the vacuum ports 785 when a controller is actuated. The vacuum ports 785 are arranged so that each corner of the sheet 402 has a corresponding vacuum port 785 positioned thereover and additional vacuum ports 785 can be located centrally over the sides 404, 406 of the sheet 402 proximate the registration marks 420.

The sheet pickup mechanism 780 is part of a robotic system and therefore it can be moved in a controlled manner. For example, the frame 770 can be at least moved in an up and down manner to permit the vacuum ports 785 to move between a retracted position and an extended position where the vacuum ports 785 are brought into a proximate relationship with the underlying sheet 402. Any number of different types of actuators can be used to effectuate the movement of the frame 770 between multiple, different positions. When each vacuum port 785 is actuated, negative pressure is formed in each vacuum port 785 causing and due to the close proximity between the sheet 402 and the frame 770, the sheet 402 is drawn toward (lifted up from the underlying sheets 402) and held in place by the vacuum. Once the sheet 402 is held by the vacuum ports 785 of the frame 770, movement of the third carriage 750 along the third secondary track 760 and the main track 450 results in the sheet 402 being capable of being moved from one location (station) to another location (station) and allows other items, as described below, to be delivered to the fourth station 600.

More specifically, the sheet pickup mechanism 780 is intended to move items between the substrate 610 at the fourth station 600 and another downstream processing location, such as a fifth station 800. In accordance with the present invention, the fifth station 800 includes a plurality of lens sheets 900. Similar to the stack of interlaced print sheets 402, the lens sheets 900 are arranged in a stack with the lens portion of the sheet 900 facing upward.

Figure 8:
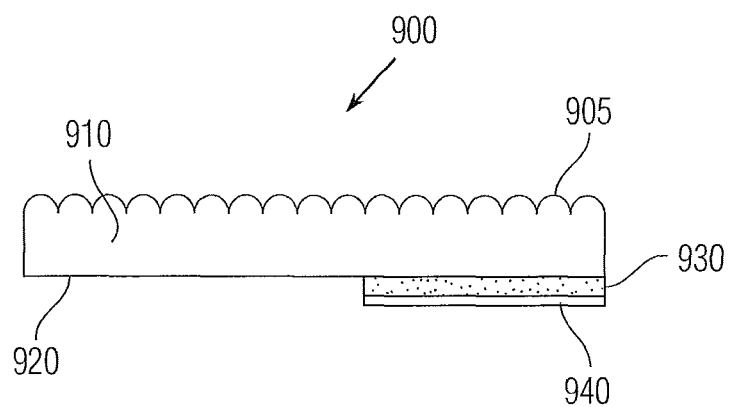
FIG. 8 is a cross-sectional view of a lens sheet with an adhesive region and release layer.

As shown in FIG. 8, the lens sheet 900 has a lens portion 910 along a top surface 905 of the sheet 900 and an opposite bottom surface 920. The bottom surface 920 is typically a planar surface. In accordance with one embodiment, the bottom surface 920 has an adhesive layer 930 formed in a select area thereof. More specifically, the adhesive layer 930 can be formed within a center region of the bottom surface 920 or it can be formed along one half of the bottom surface 920 or at some other location. The adhesive layer 930 can be formed of any number of different types of adhesives and in one embodiment, the adhesive layer 930 is a pressure sensitive adhesive (PSA). A PSA format that is particularly amenable to use with the present system includes adhesive that substantially extends across the lens sheet in one axis, but is expressly left short of the full sheet dimension so that two adhesive-free margins remain at opposite ends of each sheet. It should be noted that in this case, the term "substantially extends across" is meant to include those preparations both in which the PSA is made truly flush with the lens edge, and those in which the PSA is slightly set back. A setback may be specified in certain PSAs to anticipate elastic deformation of the adhesive during lamination, which might otherwise result in bleeding of the PSA and unintended marring or bonding of stacked assemblies. Commonly, the region of the print carrying interlaced imagery will effectively correspond with the PSA-coated region. A release liner 940 is provided and covers the exposed surface of the adhesive layer 930. The release liner 940 can be formed of any number of different suitable materials, including a paper or plastic material. As is known, the release liner 940 is removed to expose the adhesive layer 930 and permit bonding of the lens sheet 900 to another structure, such as the sheet 402 as described herein. The lens sheet 900 preferably is provided in a size that is the same size as the print image sheet 402 (e.g., photograph) or slightly greater. For example, the lens sheet may be dimensioned to extend slightly beyond the print so that gripping and positioning devices may have unhindered access to upper and lower surfaces of a lens sheet. Also, the print may be dimensioned and positioned so that a small border of the print medium ultimately protrudes beyond the perimeter of the adhered lens sheet. This protrusion may be used as a mechanical positional reference for subsequent operations, such as the cutting or separation of the images. These options are independent and may be combined within the same layout. It will therefore be appreciated that the location of the adhesive layer 930 and release layer 940 are elective and can be different than the illustrated location.

In accordance with the present invention, once the sheet 402 has been placed on the substrate 610 at the fourth station 600, a lens sheet 900 is then delivered to the fourth station 600 using the sheet pickup mechanism 780 in the manner described above. In particular, the vacuum ports 785 are actuated when the frame 770 is disposed over the lens sheet 900 resulting in the lens sheet 900 being securely held on the frame 770 and capable of movement to other locations, such as the fourth station 600. As with each of the sheet pickup mechanisms described herein, the sheet pickup mechanism 780 is configured so that it can move up and down as well as move linearly (side to side) between the various stations. While the stations are shown herein as being essentially linear in layout, it will be understood that the stations are not limited to being in a linear layout and instead can be laid out in other manners. It may also be appreciated that a cleaning system such as a set of suitably configured rollers including one adhesive pick-up roller may be interposed between the lens stack and fourth station 600 in order to remove dust from the PSA release liner or other suitable surface, in a manner analogous to that rollers 540 which were previously described as a means to clean the print surface.

Once the lens sheet 900 is delivered to the fourth station 600, the lens sheet 900 is then disposed over the sheet 402 in an overlying manner. The alignment between the lens sheet 900 and the underlying sheet 402 is initially performed by the sheet pickup mechanism 780 which delivers the lens sheet 900 to a location where the sheet 402 is present; however, as described below, the fourth station 600 includes a precision alignment mechanism to ensure that the lens sheet 900 is aligned with precision relative to the sheet 402.

The fourth station 600 also includes a pair of gripper units 1400 that are provided along two opposing sides 612, 614 of the substrate 610. The gripper units 1400 are operatively connected to a controller to permit each gripper unit 1400 to be individually controlled. The gripper units 1400 can be any number of conventional gripper units and can be of the type that has a pair of opposing gripper fingers that can be actuated to hold an item (e.g., the lens sheet 900) therebetween. The gripper units 1400 are opposite one another and therefore opposite sides of the lens sheet 900 that is to be grasped. The gripper units 1400 are controllable and movable so that the position of the sheet 900 relative to the underlying sheet 402 that is disposed on the substrate 610 can be adjusted by controllably moving one or more of the gripper units 1400. The gripper units 1400 can have multiple degrees of freedom. For example, the gripper unit 1400 can more in a forward direction toward the sheet 402 and a rear direction away from the sheet 402 and can move in a side-to-side direction along the length of one of the sides 404, 406. This permits the position of the lens sheet 900 to be changed relative to the sheet 402. For example, the independent control over the two gripper units 1400 permit one or both sides of the lens sheet 900 to be adjusted relative to the underlying sheet 402. Thus, the skew can be monitored and adjusted.

In one embodiment, the gripper unit 1400 is a stepper motor based device that permits control, with a high degree of precision, over the movement of the lens sheet 900 relative to the sheet 402. A stepper motor in use compatibly with the current invention has a 5 micron (0.0002") step size. The points of contact between the grippers and the gripped material may be outfitted in various ways. However, any laxness or ambiguity in the contact points may induce error or delay in the automated positioning. It has been found that a gripper that captures the lens sheet between two rigid pins, such as conically pointed metal set screws, provides an effective and reliable means of contact. Given a gripper at each opposite end of a lens sheet, this method provides two secure contact points in the same plane. The coordinates of these contact points can then be interactively reestablished by actuation, to whatever degree required to obtain the desired alignment.

It will also be appreciated that the substrate 610 at the station 600 can include some means for securely holding the sheet 402 in place as adjustments are made to the lens sheet 900 that overlies the sheet 402.

The fourth station 600 includes other components for processing the sheet 402 that is located on the substrate 610. More specifically, the system of the present invention additionally has an alignment/registration system 1000 for assuring that the assembled lens sheet 900 and the sheet 402 are properly aligned; an adhesive application device 1100; and a curing system 1200. More specifically, the alignment/registration system 1000 is designed to align the lenticular lens sheet 900 to a matching printed photograph (sheet 402). It should be generally noted that the exact location of components in compact automation systems depends upon such factors as component dimensions, paths of travel, and access for maintenance. These properties may vary between different implementations, between manufacturers, or within a single vendor's line of components. For example, in envisioned variations of the present system, application of liquid adhesive through adhesive application device 1100 is not limited to the illustrated location, but can occur at any stage after prints emerge from the cleaning roller. For example, a stationary applicator located near the exit side of rollers 540 may apply a continuous bead without the need to move the application device, given coordinated print motion and adhesive metering.

The alignment of the print sheet and lens sheet can also include mechanical alignment features which provide gross alignment of the sheet materials. An example of such a mechanical feature is a set of retractable pins. The pins may be tapered so that as a sheet of material is released onto the alignment table, the sheet is guided into approximate position and temporarily retained by the set of pins. In the practice of the invention, four pins for each sheet of material have been found effective.

Alignment pins can be retractable so that subsequent alignments and adjustments can be made in an unobstructed fashion. Each set of four pins is generally controlled so that the retraction of the set is synchronous. Alignment pins can also be mounted on adjustable bases, so that a degree of dimensional inconsistency between batches of sheet goods may be accommodated.

The alignment/registration system 1000 includes an optic device 1010 that is used in the alignment process and more particularly, the optic device 1010 can be in the form of first and second spaced cameras 1020, 1030. The first camera 1020 is on one side of the main track 450 and the second camera 1030 is on the other side of the main track 450 spaced from the first camera 1020. The first and second cameras 1020, 1030 are located above the substrate 610 at the fourth station 600 and are designed to focus on select areas (locations) of the substrate 610. As described below, the first and second cameras 1020, 1030 are designed to focus on the registration marks 420. In accordance with one embodiment of the present invention, each of the first and second cameras 1020, 1030 are in the form of a camera that includes a telecentric lens. A telecentric lens is a compound lens which has its entrance or exit pupil at infinity. This means that the chief rays (oblique rays which pass through the center of the aperture stop) are parallel to the optical axis in front of or behind the system, respectively. A telecentric lens has no angular parallax which makes it a reliable way to look through the lenticular lens sheet 900. In addition, a telecentric lens can be used since it is designed to focus on the small (e.g., half-inch sized) registration mark 420 and therefore is quite suitable for the intended application.

Figure 9:
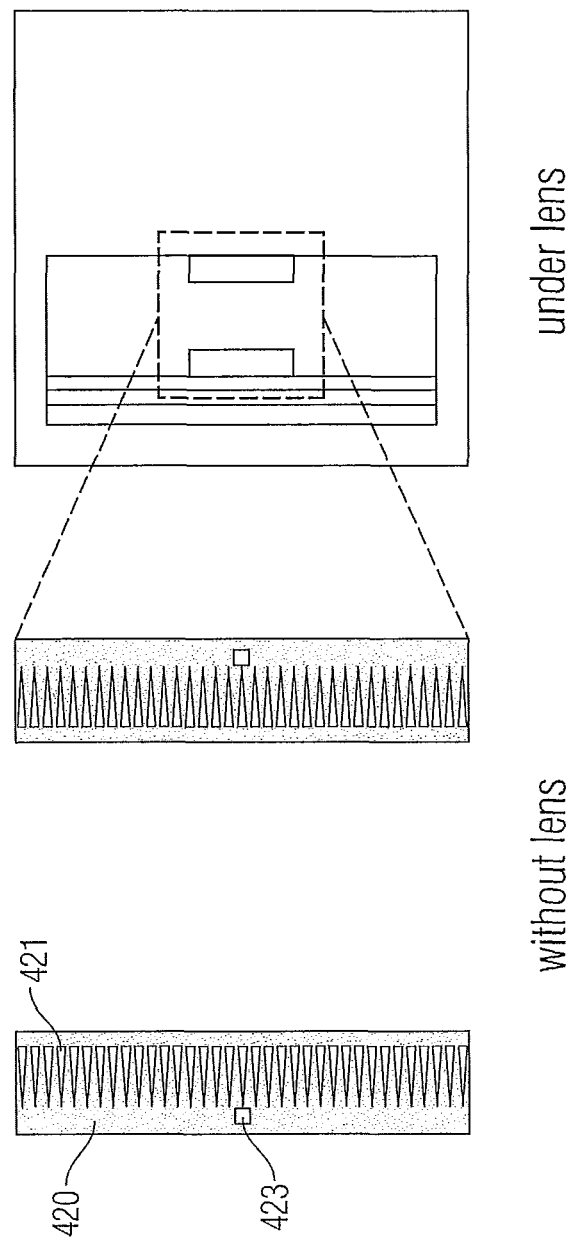
FIG. 9 is an enlarged view of registration marks that are formed on the print sheet of FIGS. 7A and B.

The registration mark 420 is shown in magnified form in FIG. 9 and it will be appreciated that the registration mark 420 consists of a plurality of side-by-side arrowheads 421 that all point in the same direction as well as a small square 423 that is centrally located along the plurality of arrowheads 421 and is located adjacent a point of one of the arrowheads 421. In particular, the registration mark 420 can be in the form of a half-inch square precision arrowhead pattern that is printed on the sheet 402 as described previously. As shown in FIG. 9, the tips of the arrowheads 421 point toward the side edge of the sheet 402. As shown in FIG. 9, under the telecentric lens, the arrowhead shape is spread out by the lens optics.

Figure 10:
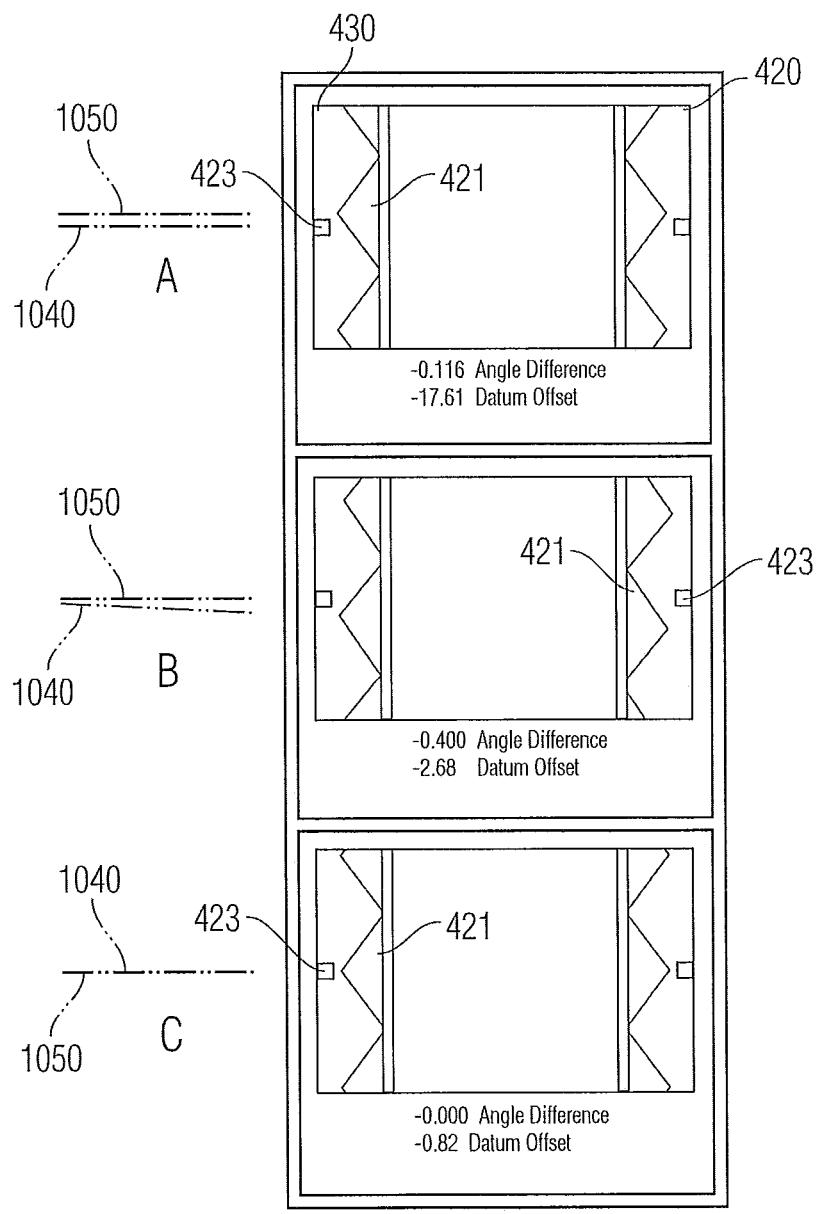
FIGS. 10A-10C show various alignments between the lens sheet and print sheet and the observable differences in the registration marks of each of the different alignments.

FIG. 10 shows how the registration marks 420 are viewed through the telecentric lenses of the first and second cameras 1020, 1030. In particular, the registration mark 420 shown on the left corresponds to the registration mark 420 that is formed along side 404 of the sheet 402, while the registration mark 420 that is shown on the right corresponds to the registration mark 420 that is formed along the side 406 of the sheet 402. As shown, the telecentric lenses of the cameras 1020, 1030 focus on the square 423 and adjacent arrowheads 421 located within each registration mark 420.

Another registration feature of the present invention is the presence of a target location axis, generally shown at 1040, and a lens axis, generally shown at 1050, that are visible as part of the machine's vision system. These two axes 1040, 1050 are similar to a cross hair that shifts as the lens sheet 900 moves relative to the sheet 402. Optimal, desired positioning between the lens sheet 900 and the sheet 402 result when the axes 1040, 1050 overlap one another.

FIG. 10A shows the situation where the lens sheet 900 is off-centered relative to the sheet 402. In this off-centered arrangement, each square 423 of each registration mark 420 is not aligned with the center or tip of the adjacent arrowhead 421. In other words, the tip of the arrowhead 421 is not pointing at the square 423. In addition, the off-centered nature of the lens sheet 900 relative to the sheet 402 is seen by the parallel spacing between the two axes 1040, 1050. FIG. 10B shows the situation where the lens sheet 900 is skewed relative to the sheet 402. Both squares 423 are not aligned with the tips of the arrowheads 421. In addition, the axes 1040, 1050 are spaced apart but unlike in FIG. 10A, the axes 1040, 1050 are also not parallel to one another and in particular, the right side of the axis 1050 is spaced greater from the axis 1040. FIG. 10C shows the situation where the lens sheet 900 is properly aligned relative to the sheet 402. When properly aligned not only are the squares 423 of both registration marks 420 aligned with the tips of the arrowheads 421 but also the axes 1040, 1050 are aligned as evidenced by the axes 1040, 1050 overlap one another.

As described above, the sheet 900 is controllably moved in very small increments (e.g., using stepper motors, etc.) to position the lens sheet 900 in proper alignment with the sheet 402 which is validated by the information receives from the telecentric cameras. As shown in the figures, the information from the telecentric cameras is conveniently displayed on a display to allow the operator to see in real-time the adjustment and the proper alignment between the lens sheet 900 and the sheet 402. Changing the appearance of the registration mark 420 is used to correct both skew and centering of the lens sheet 900 relative to the sheet 402. In addition to the observations discussed above, banding in the image and border indicate lens/image misalignments.

Accordingly, in accordance with the present invention, the alignment system of the present invention is a machine vision based system in which the operation of the stepper motors (e.g., in the grippers) result in the lens sheet 900 being properly aligned with the sheet 402 in about 2-3 seconds due to the precision and speed of the stepper motors. For example, the precise adjustment and alignment of the two sheets can be done very quickly and precisely due to the incremental adjustments of the stepper motors (e.g., 4200 motor steps).

As previously mentioned, the alignment/registration system 1000 includes an adhesive application device 1100 for applying an adhesive to the sheet 402 to at least temporarily and selectively bond the overlying lens sheet 900 to the sheet 402. The device 1100 is designed to controllably deliver an amount of adhesive within a controlled area and in particular, the device 1100 is positioned and designed to lay done adhesive along the adhesive locator mark 430 that is part of the sheet 402. The adhesive locator mark 430 is in the form of a line that extends along the side of the sheet 402 and therefore, the device 1100 is configured to lay down an adhesive in a linear manner such that the adhesive overlies the locator mark 430. The applied adhesive can be thought of as a bead of adhesive material. The adhesive can be a number of different types of adhesive; however, in one embodiment, the adhesive is in the form of a UV curable adhesive. It will also be understood that the adhesive is applied to the locator mark 430 prior to deliver and placement of the lens sheet 900 over the sheet 402 since the adhesive selectively bonds the two sheets 900, 402 together.

The curing system 1200 of the system 1000 includes a movable frame 1210. The movable frame 1210 includes a transverse support member 1212 and a plurality of support members 1214 that extend outwardly from the support member 1212 and are arranged parallel to one another.

The curing system 1200 includes a plurality of devices 1220 that are operable to cure the adhesive and in particular, the devices 1220 are in the form of a plurality of LEDs that are arranged along the transverse support member 1212.

The system 1200 also includes a sheet pickup mechanism 1300 that is designed to adhere to and remove the partially bonded sheets 900, 402. The mechanism 1300 can be in the form of a vacuum system that includes a plurality of vacuum ports 1385 that are arranged and positioned along the frame 1210 and more specifically, about the support members 1214 or other members of the frame. In the illustrated embodiment, there are at least four (4) vacuum ports 1385 that are located in each corner of the frame 1210.

Each vacuum port 1385 extends downwardly from the frame and includes a sheet engaging portion (e.g., a cup shaped vacuum member) that contacts the sheet 402. The vacuum ports 1385 are operatively connected to a vacuum source so that a vacuum can be provided in the vacuum ports 1385 when a controller is actuated. The vacuum ports 1385 are arranged so that each corner of the partially bonded sheets 900, 402 has a corresponding vacuum port 1385 positioned thereover to allow the corners of the bonded sheets 900, 402 to be lifted and moved to another location.

The sheet pickup mechanism 1300 is part of a robotic system and therefore it can be moved in a controlled manner. FIG. 6 shows a track 1500 on which the sheet pickup mechanism 1300 is movable and can be moved in multiple directions as disclosed herein. For example, the frame 1210 can be at least moved in an up and down manner to permit the vacuum ports 1385 to move between a retracted position and an extended position where the vacuum ports 1385 are brought into a proximate relationship with the partially bonded sheets 900, 402. Any number of different types of actuators can be used to effectuate the movement of the frame 1210 between multiple, different positions. When each vacuum port 1385 is actuated, negative pressure is formed in each vacuum port 1385 causing the partially bonded sheets 900, 402 to be drawn toward the frame and held in place by the vacuum. Once the partially bonded sheets 900, 402 are held by the vacuum ports 1385 of the frame 1210, the bonded sheets can then be moved from one location (station) to another location (station) by movement of the frame along a rail or some other type of device that provides controlled movement of the frame and vacuum ports 1385 from one location to another location.

In one embodiment, as shown, the curing system 1200 can be a multi-function system in that the system 1200 is not only operable to cure the adhesive laid down over locator 430 (adhesive bead) but it also can apply the adhesive (and thus serves as the applicator 1100) and also remove the bonded, assembled sheet (900, 402) from the fourth station and deliver it to another location.

For example, the partially bonded sheets 900, 402 are moved to one or more other downstream locations (not shown) where they undergo further processing and in particular, the further processing can include removal of the release layer 940 and lamination of the sheets 900, 402 to form the lenticular product. In order to process and perform lamination, the partially bonded sheets 900, 402, are typically flipped over prior to being subjected to the lamination process since, during the lamination process, the lens sheet 900 is the bottommost sheet to allow the print sheet 402 to be placed against the parts of the laminating device. More specifically, in one embodiment, the partially bonded sheets 900, 402 are flipped over and the release layer 940 is removed (manually or using an automated process (e.g., a robotic device)). The assembled sheets 900, 402 are then delivered to a laminating device which can be in the form of a pair of nip rollers. The sheets 900, 402 are introduced between the pair of nip rollers with the print sheet 402 facing up and the resultant product is a laminated lenticular product. Since as mentioned above, the print sheet 402 can include a number of separate interlaced prints (e.g., 6 per sheet), the laminated lenticular product (formed of laminated sheets 900, 402) is then introduced to a cutting device, such as a die cutter, to individually cut the lenticular prints from the main laminated lenticular product.

It will be appreciated that the carriages of the present invention can be a robotic device that is controlled using a controller, such as a personal computer, etc., that moves the carriages a precise distance along the main track 450 and the respective other tracks it is coupled to.

The alignment/registration system 1000 of the present invention advantageously provides the following features:

Adhesive with Solid Spacers

Lenticular images must maintain a specific focal distance between the lens surfaces and their common focal plane, otherwise, a visible degradation of the image occurs. Adhesives much have a certain average thickness in order to be effective; however, this thickness can vary substantial across the interface, causing errors of focus and alignment in the observed lenticular image. To mitigate this variation, spacers, such as bars or spherules of polymer or glass can be added to a fluid adhesive mixture. If the spacer material is transparent to visible radiation and the material substantially matches the refractive index of the cured adhesive, the spacers will be invisible. The spacers preserve a known separation between the two bonded materials so that the fluid adhesive obtain a relatively constant thickness. The adhesive layer carrying the spacers can be prefabricated as a PSA used subsequently to form a bond. A useful proportion, when 25µ to 100µ spherules are used, is between 1000 to 5000 parts adhesive to 1 part spherules by weight.

UV Tack/PSA Lamination

A radiation-curable fluid adhesive is applied to an outer margin of a sheet that also carried at least one preprinted interlaced image. A lenticular lens is disposed upon the preprinted interlaced image and placed in contact with the adhesive. The lens and image are brought into optimal registration. Once optimal registration is attained, radiation is applied to the marginal region that is occupied by the adhesive. Subsequent to the curing of the radiation-curable adhesive, a sheet of pressure sensitive adhesive is inserted between the back of the lenticular material (sheet 900) and the preprinted interlaced image (sheet 402). Pressure is progressively applied so that the lenticular material is placed in adhesive contact with the printed image area.

Alignment and Registration Mark

The alignment registration of lenticular lenses with a preprinted image is increasingly challenging as the lens pitch increases. Lenses must be parallel to the printed image raster, and each interlaced image band must also be exactly aligned with an associated lens. The present invention proposes a simple and compact alignment and registration indicator which exploits a conscientiously imposed difference in spatial frequency between a repeated image icon and the lenticular array. The indicator can be made so that is serves as an intuitive guide to any positional errors. A single mark can be used to align less sensitive cases such as a small image, or one using relatively coarse lenses. When two indicators are used at opposite ends a printed sheet, very slight deviations from optimal alignment can be detected. The use of two oppositely located registration marks 420 therefore enables the alignment of relatively large sheets of relatively fine pitch. The registration mark 420 can be read by machine, by a human operator, or, intermediately, by a machine vision system supervised by a human operator. Also, by foreknowledge of a finite magnification value, accommodation can be made for production circumstances in which the mark is not, or cannot be, located at the focal length of the lenses, as for example, when a film adhesive is provided with a temporary release liner.

When two marks are used, the marks are usually most effectively deployed in an aligned manner, centered at opposite ends of an interlaced, printed image. The observational cross-referencing of two spatially separated marks can reveal any deviation over the entire length of the lens sheet. For example, one mark may be observed through a camera and used to make a primary alignment. Once the primary alignment is achieved, any fractional or residual deviation occurring at the opposite end of the combined sheet materials will be observable in the optically expanded second mark. By this means, relatively large images may be precisely aligned with a high degree of reliability using a relatively small dedicated surface area.

This property is particularly relevant when telecentric lenses are employed. For example, a conventional practice in lenticular registration is to observe the distortion of pitch band patterns extended across the entire width of the print. However, the geometry of a telecentric lens requires that the lens diameter be greater than the observed area. While theoretically possible, a telecentric lens in any practical adaptation with this prior practice would cost-prohibitive.

In contrast, the registration system of the present invention allows 300×300 mm (11.8×11.8") images using lenses in the 300 to 400 micron range to be aligned using two observed areas only 12.5 mm square (0.5×0.5"). The use of the disclosed registration marks therefore reduces the implicit diameter of a requisite telecentric lens by roughly a factor of twenty.

Each exemplary registration mark includes two rows of elongate arrowheads spaced apart within a relatively small area at the margin of an interlaced print. The rows of arrowheads within a given mark are arranged so that their arrows point away from one another. Twenty to forty side-by-side arrowheads 421 are sufficient to provide the desired effect. However, in pursuit of the intuitive aspect of the registration feature, an odd number of arrowheads is typically elected, as this allows the aligned condition to be indicated by centration of the point of an optically expanded triangle.

Each row of arrowheads within the mark employs a deliberate and conscientious pitch disparity between elongate printed arrowheads and the lenses in a preselected lens array. The mark also includes indicia typified by square 423 that identify a targeted alignment position, generally located in alignment with a central arrowhead. In a tested embodiment, printed arrowheads are devised be isosceles triangles having a base-to-height ratio of approximately 1:5. A frequency disparity value of about 9% has been found especially effective over a range of commercially lens pitches when used in conjunction with either human or machine vision.

When this proportionality is provided, a suitable lenticular lens array located upon the elongate printed will yield refractively expanded triangles having a vertex angle of approximately 90°, implying a base-to-height ratio of approximately 1:0.7. Therefore, in this exemplary case, the arrowheads are subject to a roughly sevenfold transverse optical expansion.

It should be noted that this degree of expansion is primarily the result of a frequency effect, and does not strictly rely upon the numerical optical magnification of the lenticular lenses. As a result, the optical effectiveness of the arrangement has been found to be relatively robust, even in cases where an air gap or temporary protective film intrudes between the back of the lens sheet and the printed material. While a range of frequency disparity of 5% to 15% is effective in this application, it has been found that relatively lower disparity values results in a lower-contrast optical result, while relatively higher disparity values diminish the spatial amplification effect which serves to reveal any misalignment.

More specifically, a functional property of this spatial relationship is that the lens array not only expands the arrowhead pattern, but amplifies any skew or transverse displacement contemporaneously occurring between the lenses and the central indicia. Furthermore, as long as the arrowhead pitch is chosen to be the lesser of the two frequency values, the optical behavior of the mark is intuitive. Namely, if the lens sheet is skewed in a counterclockwise orientation, the arrowheads appear skewed or sheared in the same direction. The actual skew angle, though, is optically exaggerated in the observed mark. As a result, relatively subtle skewing is made readily apparent.

Similarly, any shift from the central axis identified by the indicia is revealed by a departure of the expanded triangles from an aligned location; this displacement is also amplified by the optical relationship of the registration mark and lens material. These properties of the alignment system therefore facilitate relatively swift and certain alignment, be it manual or automated.

A fully automated alignment system would of course be indifferent to design factors relating to human cognitive expectation. A machine vision and registration application could readily be programmed to react to visual input that might be confusing or counterintuitive to a human observer. The utility of the present registration system therefore should not be taken to be limited to any linkage of actual movement or displacement and apparent movement or displacement.

Automated Registration

Two cameras using telecentric lenses are aimed through the lenticular sheet 900 to focus upon two specially devised targets located as substantially opposite ends of a lenticular lens sheet 900. The lenticulated sheet 900 is placed in a temporary, roughly aligned position on top of the sheet 402 carrying at least one preprinted, interlaced image between the targets. The lens sheet 900 is then gripped, at least two locations, by a mechanical clamping device. Each clamping device is connected to an actuator. The actuators are advanced or retracted based on information derived from the image of the targets received by the camera's sensors. By conscientiously imparting relative motion to the actuators, the gripped lens sheet 900 is shifted until it is in precise alignment with the preprinted interlaced image content. The printed image and the lenticular lens sheet 900 can then be mechanically, frictionally, or adhesively fixed in the aligned position.

PSA Liner Preparation

A film adhesive is specially prepared to ease, accelerate, or automate lamination of lenticular images. In one embodiment, the film adhesive is manufactured so that at least one edge of one release liner extends beyond one edge of the adhesive layer. This free material extending beyond the edge of the adhesive layer can then be manually, pneumatically, hydraulically or mechanically gripped without unwanted contact between the gripping means and the adhesive layer. The adhesive layer can thereby be exposed without contamination or fouling of either the adhesive surface or the gripping means.

Use of a Contiguous Reference Edge in the Parting of Lenticular Images

Lenticular images are often produced in layouts containing multiple images. These individual images are then parted from one another by a separating means such as a knife, break, shear, guillotine cutter, slitter, die cutter, laser or waterjet. However, when lenticular images are assembled by laminating a prefabricated interlaced image to prefabricated lenticular lens sheet, residual lenticular material can not allow any reliable mechanical registration with any such separating means. The present invention expressly allows for a marginal extension of the layer upon which the image in printed. If the limit of the marginal extension is used as a reference in both the imaging phase and the separation phase, the images will occupy a known location, relative to the limiting edge, at the time the images are parted. Alignment of the separation means with the locations of the printed imagery can thereby by effectively eliminated.

Figure 11:
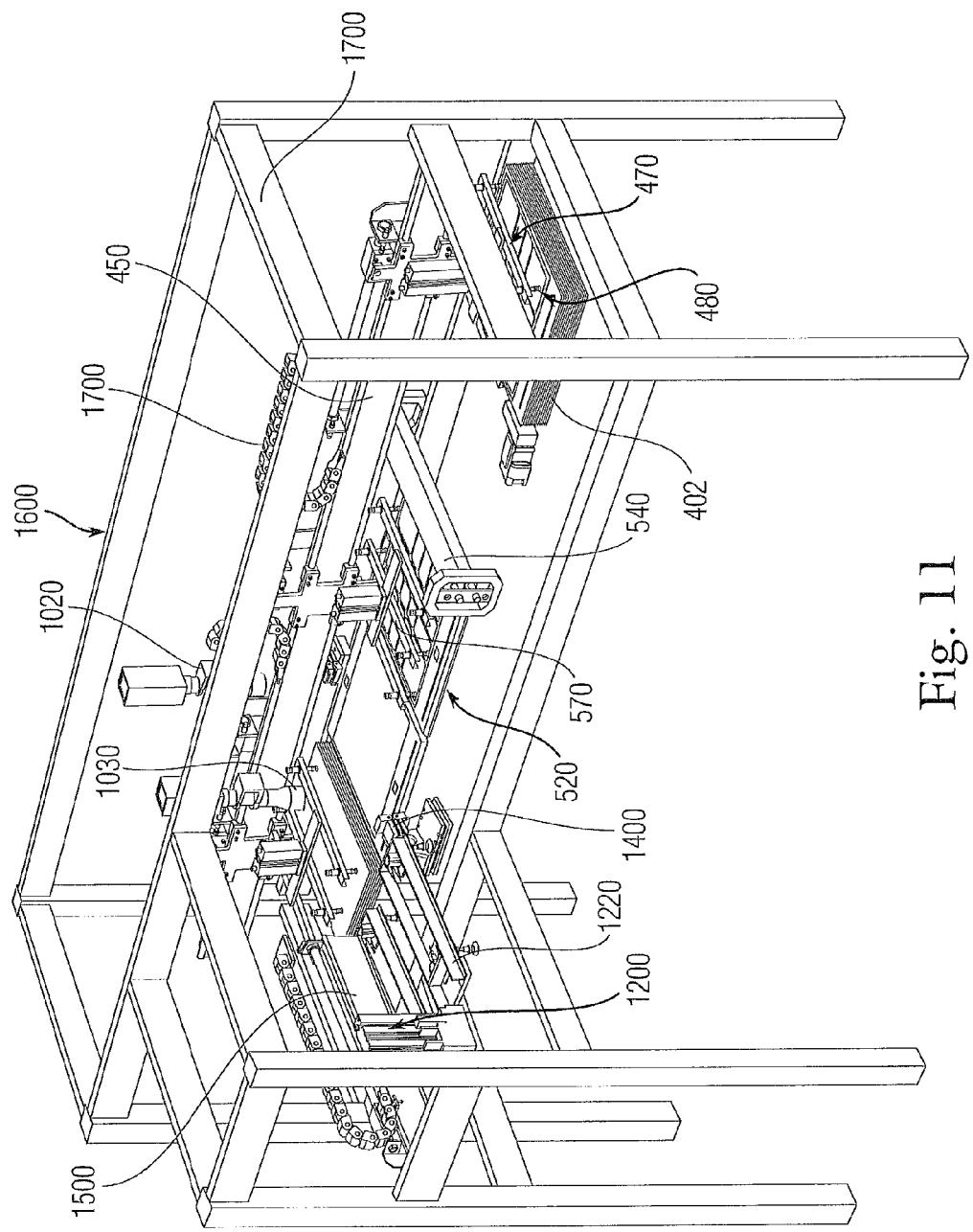
FIG. 11 is a side perspective view of an automated system for the assembly, alignment and adhesion of a lenticular product according to a second embodiment.

FIG. 11 is a view of an automated system 1600 for the assembly, alignment and adhesion of a lenticular image (lenticular product). The system 1600 is similar to the system 400 and is formed of a number of individual components and/or stations and therefore, similar stations and components are numbered alike. The main difference between the system 1600 and the system 400 is that the second station 490 is eliminated and instead, the first secondary track 460 travels to the nip rollers 540. Accordingly, the frame 470 can be delivered at least to a location proximate the nip rollers 540. The first carriage 440 and frame 470 thus ride along the secondary track 460 to a location adjacent the nip rollers 540 to thereby feed the leading edge 405 of the sheet 402 into the space between the nip rollers 540. Once fed into the nip rollers 540, the rolling action of the rollers 540 causes advancement of the printed sheet 402 as well as cleaning of the sheet.

It will also be appreciated that FIG. 11 shows the system 1600 coupled to framework 1700. In FIGS. 5 and 6, the framework has been eliminated only for ease of illustration and simplicity; however, the system 400 would also be coupled to some type of framework, such as framework 1700. A wire management system 1700 can be used to manage cables, conduits, wires (such as vacuum tubes, etc.).

While the invention has been described in connection with certain embodiments thereof, the invention is capable of being practiced in other forms and using other materials and structures. For example, where the term "photographic" is used, it should be taken to colloquially connote the common practice reproducing of an optically captured source image. It is not intended to restrict the invention to printing based on silver halide or any other specific chemistry or means of duplication, nor to the realm of optically captured images. Partly or wholly non-photographic images, including those originated in or modified by various types of design or editing software, are expressly anticipated and included within the invention. Printed imagery is widely known to be producible through the use of colorants in liquid, solid, powder, film, emulsion, or gaseous form, in combination with a vast range of compatible latent, direct and indirect image generation technologies, and no method of image reproduction or combination thereof should be taken to be excluded from the ancillary practices herein described. Accordingly, the invention is defined by the recitations in the claims appended hereto and equivalents thereof.

What is claimed is:

1. An automated lenticular photographic system comprising:
   an interface that permits a user to upload image files;
   image processing and printing equipment that is in communication with the interface for receiving the uploaded image files and processing the uploaded image files to create an interlaced print image file that is used to produce an interlaced print sheet containing interlaced print images, wherein a pair of registration marks is formed on the interlaced print sheet outside of borders of the interlaced print images;
   a processing station where the interlaced print sheet is aligned with a lenticular lens sheet with a registration system that detects whether the lenticular lens sheet is off-centered and skewed relative to the interlaced print sheet; and
   means for controllably adjusting the position of the lenticular lens sheet relative to the interlaced print sheet until proper registration between the lenticular lens sheet and the interlaced print sheet is achieved, wherein the lenticular lens sheet is at least selectively joined to the interlaced print sheet to provide a lenticular product that can be delivered back to the user; and
   wherein the registration system includes a display on which a target location axis and a lens axis are displayed, wherein a relative position of the target and lens axes shifts as the lenticular lens sheet moves relative to the interlaced print sheet, wherein optimal, desired positioning between the lenticular lens sheet and the interlaced print sheet result when the target location and lens axes overlap one another.

2. The system of claim 1, wherein the interface comprises a kiosk.

3. The system of claim 1, wherein the interface comprises a personal computer.

4. The system of claim 1, wherein the uploaded image files comprises digital image files and the lenticular product includes at least one of a 3-Flip image lenticular product and a Zoom image lenticular product.

5. The system of claim 4, wherein the interface includes a display for displaying the uploaded images and a movable positioning tool that can be positioned over a portion of at least one uploaded image that is intended to be zoomed, wherein a size of the positioning tool can be changed to change a size of the zoom portion of the lenticular portion.

6. The system of claim 1, further including:
   means for applying an adhesive on a select portion of the interlaced print sheet prior to the lenticular lens sheet being disposed over the interlaced print sheet; and
   means for curing the adhesive so as to locally attach the lenticular lens sheet to the interlaced print sheet.

7. The system of claim 1, wherein the registration system comprises an optic registration system monitors a relative position of the registration marks relative to the lenticular lens sheet.

8. The system of claim 7, wherein the optic registration system includes a pair of telecentric cameras for viewing the registration marks through the lenticular lens sheet.

9. An automated lenticular photographic system comprising:
   an interface that permits a user to upload image files;
   image processing and printing equipment that is in communication with the interface for receiving the uploaded image files and processing the uploaded image files to create an interlaced print image file that is used to produce an interlaced print sheet containing interlaced print images, wherein a pair of registration marks is formed on the interlaced print sheet outside of borders of the interlaced print images;
   a processing station where the interlaced print sheet is aligned with a lenticular lens sheet with a registration system that detects whether the lenticular lens sheet is off-centered and skewed relative to the interlaced print sheet; and
   means for controllably adjusting the position of the lenticular lens sheet relative to the interlaced print sheet until proper registration between the lenticular lens sheet and the interlaced print sheet is achieved, wherein the lenticular lens sheet is at least selectively joined to the interlaced print sheet to provide a lenticular product that can be delivered back to the user; wherein each registration mark is formed of a plurality of side-by-side arrowheads that all point in a first direction as well as a small square that is centrally located along the plurality of arrowheads and is located adjacent a pointed tip of one of the arrowheads, wherein when the lenticular lens sheet and the interlaced print sheet are properly aligned, the squares of both registration marks are aligned with tips of the arrowheads.

10. The system of claim 6, wherein the means for curing the adhesive includes a curing device that includes a movable frame that supports a plurality of LEDs, wherein the means for applying an adhesive is coupled to the movable frame.

11. The system of claim 6, wherein the interlaced print sheet includes an adhesive locator mark that is used as a guide for laying down the adhesive along one side of the interlaced print sheet.

12. A method for aligning a printed interlaced image with a lenticulated lens sheet, including the steps of:
    forming a registration mark having a regular arrangement of elongate geometrical features upon a sheet carrying a printed interlaced image, each of said elongate features being elongate in an axis parallel to the elongate image fields in said interlaced image, said regular arrangement having a spatial frequency measurably different from the pitch of the anticipated lenticulated lens sheet,
    superimposing a lenticulated sheet in approximate alignment with said interlaced image, such that the collective magnification effect of a subset of the lenticular lenses within said lenticulated lens sheet upon said regular arrangement of elongate geometrical features generates at least one transversely expanded image of said elongate features,
    observing the appearance of said at least one transversely expanded image of said elongate features,
        comparing the observed optical result to a predetermined target result, and
    adjusting the relative position of said printed interlaced image and said lenticulated lens sheet to approach said predetermined target result.

* * * * *